(12) United States Patent
Gebhard et al.

(10) Patent No.: US 9,463,813 B2
(45) Date of Patent: Oct. 11, 2016

(54) REAR-VENTILATED AWNING FOR ROOF UNITS OF RAIL VEHICLES

(71) Applicant: SIEMENS AKTIENGESELLSCHAFT, Munich (DE)

(72) Inventors: Bruno Gebhard, Forchheim (DE); Markus Thamm, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 14/411,252

(22) PCT Filed: Jun. 6, 2013

(86) PCT No.: PCT/EP2013/061631
§ 371 (c)(1),
(2) Date: Dec. 24, 2014

(87) PCT Pub. No.: WO2014/001047
PCT Pub. Date: Jan. 3, 2014

(65) Prior Publication Data
US 2015/0336592 A1    Nov. 26, 2015

(30) Foreign Application Priority Data
Jun. 26, 2012 (DE) .................. 10 2012 210 857

(51) Int. Cl.
*B61D 17/00* (2006.01)
*B61D 17/12* (2006.01)
*B61C 3/00* (2006.01)
*B61C 17/04* (2006.01)
*B61D 17/16* (2006.01)

(52) U.S. Cl.
CPC .............. *B61D 17/12* (2013.01); *B61C 3/00* (2013.01); *B61C 17/04* (2013.01); *B61D 17/16* (2013.01)

(58) Field of Classification Search
CPC ........ B61D 17/12; B61D 17/16; B61C 3/00; B61C 17/04
See application file for complete search history.

(56) References Cited

U.S. PATENT DOCUMENTS

| | | | | |
|---|---|---|---|---|
| 1,780,001 A * | 10/1930 | Bruce | ............... | B61F 1/06 105/172 |
| 2,439,095 A * | 4/1948 | Mitchell | ............ | E04B 7/026 454/250 |
| 2,618,821 A | 11/1952 | Corn | | |
| 2,666,497 A * | 1/1954 | Weber | ............... | B61C 5/02 105/59 |
| 3,116,700 A * | 1/1964 | Aydelott | ............ | B61C 5/02 105/59 |
| 3,789,747 A * | 2/1974 | Wasserman | ...... | F24F 7/08 454/186 |
| 4,186,665 A * | 2/1980 | de Jong | ............. | B61C 17/04 105/26.05 |
| 4,609,126 A * | 9/1986 | Janda | ............... | H02B 7/06 174/16.1 |
| 5,765,329 A * | 6/1998 | Huang | ............... | E04D 3/30 165/49 |
| 5,950,753 A * | 9/1999 | Muldoon | ........... | B60K 11/00 180/68.1 |
| 7,392,749 B2 * | 7/2008 | Bendig | ............. | B61C 5/00 105/172 |
| 8,196,521 B2 * | 6/2012 | Wright | ............. | B61C 7/04 105/140 |
| 2010/0071584 A1 * | 3/2010 | Smith, Jr. | ........ | B61C 5/02 105/35 |

FOREIGN PATENT DOCUMENTS

EP    2078655 A1    7/2009
WO    2008006679 A2    1/2008

* cited by examiner

*Primary Examiner* — Jason C Smith
(74) *Attorney, Agent, or Firm* — Laurence Greenberg; Werner Stemer; Ralph Locher

(57) ABSTRACT

A rail vehicle includes a roof and a first shading plate disposed at a distance from the roof. The first shading plate has first openings for the passage of air.

12 Claims, 3 Drawing Sheets

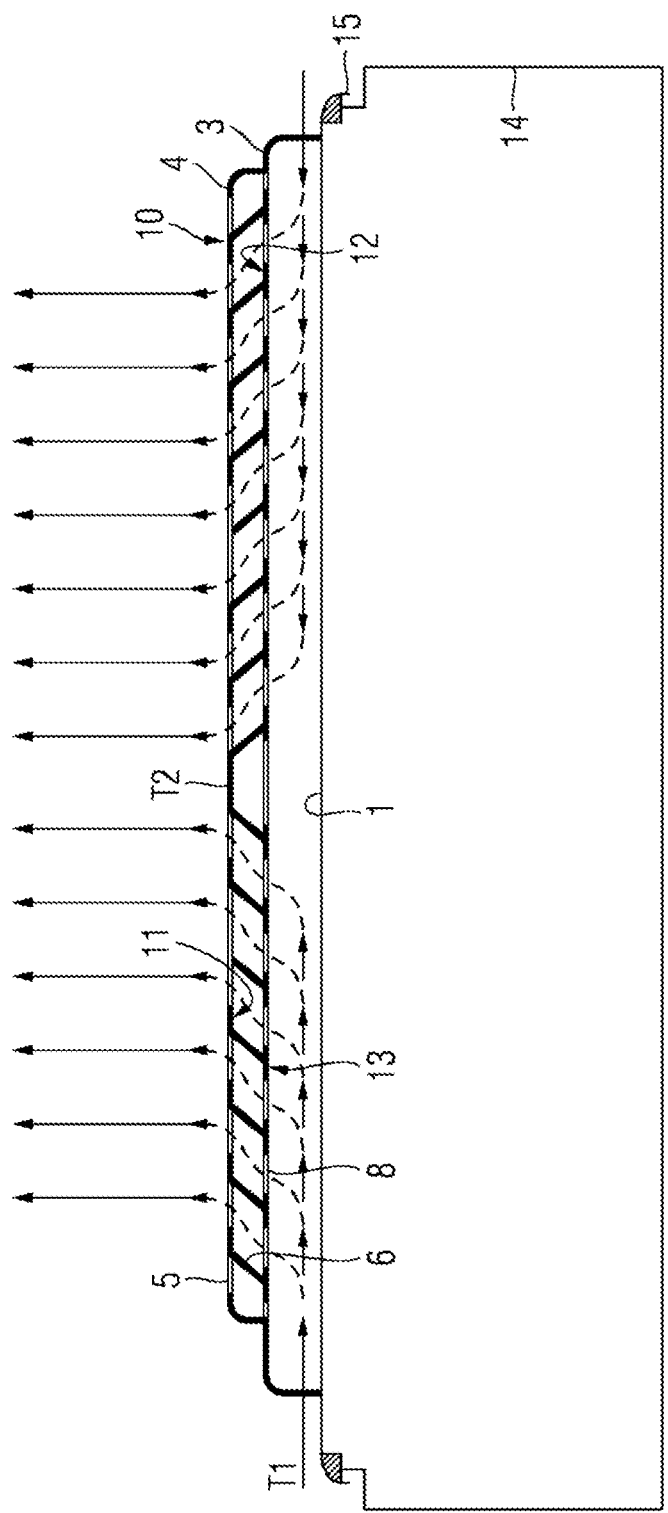

REAR-VENTILATED AWNING FOR ROOF UNITS OF RAIL VEHICLES

BACKGROUND OF THE INVENTION

Field of the Invention

The invention relates to a rail vehicle having a roof and a first shading plate, which is arranged at a distance from the roof.

In sunny and thus hot regions, assemblies arranged on the roof of a rail vehicle are strongly heated. This can result in damage to temperature-sensitive components, for example controllers. To remedy this, awnings are arranged over particularly critical points of the roof, for example with a distance between roof and awning of approximately 20 mm in the Siemens Combino. At this small distance, however, hardly any air is exchanged between roof and awning and the roof is therefore hardly kept cooler than without the awning. A greater distance could result in a sufficient air exchange, but this would be accompanied by a comparatively more massive support of the awning and a possibly undesired tall roof structure.

BRIEF SUMMARY OF THE INVENTION

The invention is based on the problem of counteracting heating of a roof of a rail vehicle due to solar radiation.

The problem is solved by the subject matter of the independent patent claim. Refinements and embodiments of the invention are found in the features of the dependent patent claims.

A rail vehicle according to the invention, in particular a rail vehicle of passenger transport, in particular short-range transport, comprises a roof, which is watertight in particular, and a first shading plate, which is arranged on the roof, at a distance greater than zero to the roof. The first shading plate has in this case first openings for the passage of air.

According to a first refinement, at least one further, second shading plate, which in turn has second openings for the passage of air, is arranged between the first shading plate and the roof. The second shading plate is also arranged at a distance from the roof of the rail vehicle.

The second shading plate is arranged in parallel to the first shading plate in this case in a refinement. The first shading plate is in turn arranged in parallel to the roof in particular. The roof in turn extends essentially horizontally according to one embodiment of the invention. The webs between the openings of the respective shading plates, which lie in a shared surface, in particular in a shared plane, establish in this case the surface, to which reference is made in this context, of the respective shading plate.

A further refinement of the solution according to the invention provides that a ratio of a first distance between the first shading plate and the roof and a second distance between the second shading plate and the roof is between 1.0 and 1.5, in particular in the interval of 1.2 and 1.5. The distance between the first shading plate and the roof is, for example, at least 20 mm, but at most 30 mm. It is 30 mm in particular. The distance between the second shading plate and the first shading plate is in turn, for example, at least 20 mm but at most 30 mm, in particular 20 mm.

Each opening in the first and in the second shading plate has a clearance dimension. The greater this clearance dimension, the more light can pass through the opening. In this case, it is primarily unimportant in which direction the light falls through the opening. A clearance width of an opening of the first or the second shading plate is defined here as the greatest surface area of a passage area of a light bundle made of light beams which are parallel to one another through the opening perpendicular to the light beams. If light of a light source at a very great distance, such as the sun, falls through the opening on a plane perpendicular to the light beams, the surface area of an illuminated area corresponds to the clearance dimension of the opening in the direction of the light beams. The greatest clearance dimension corresponds to the clearance width of the opening. A projection of the first and/or the second shading plate perpendicular to the roof therefore maps the clearance dimensions of the openings perpendicular to the roof on the roof.

According to one exemplary embodiment of the invention, a ratio of the sum of all clearance widths of the first openings of the first shading plate, i.e., a total passage area through the first shading plate, and the sum of all clearance widths of the second openings of the second shading plate, corresponding to a total passage area through the second shading plate, is between 0.5 and 2, in particular lies in the interval of 0.7 and 0.95.

According to one refinement, a ratio of the sum of all clearance dimensions of the first openings of the first shading plate perpendicular to the roof and the sum of all clearance dimensions of the second openings of the second shading plate perpendicular to the roof is between 0.5 and 2, in particular, the ratio lies in the interval of 0.9 and 1.1. As already explained above, the sum of all clearance dimensions of the openings of one of the shading plates perpendicular to the roof corresponds to the area of the openings of the shading plate projected perpendicularly onto the roof.

In a refinement, the openings of the first and/or the second shading plate are each of equal size at least regionally, in particular in the longitudinal direction of the rail vehicle. For example, all openings of the first and/or the second shading plate each have approximately the same shape and size. According to another embodiment, the size of the openings of the first and/or the second shading plate increases from the outside toward the inside in the transverse direction of the rail vehicle, to force air from the outside up to the middle, to perform cooling over the entire width.

In a refinement, the second shading plate is arranged between the first shading plate and the roof so that at least one projection of the first and the second shading plate on the roof and perpendicularly to the roof is free of openings.

Both the first shading plate and also the second shading plate have openings of predefined sizes and shapes perpendicular to the roof. Webs are arranged between the openings. If the first and the second shading plates are now projected perpendicularly to the roof onto the roof, the webs of the one shading plate overlap the openings of the other shading plate. They mutually shade one another. This is achieved, for example, in that the second openings are arranged offset in relation to the first openings.

According to a further refinement of the invention, the second shading plate is arranged between the first shading plate and the roof so that each straight line, which extends through a first opening of the first shading plate and through a second opening of the second shading plate and intersects the roof, intersects the roof at an angle less than 30° or greater than 150°, in particular the angle is less than 20° or greater than 160°.

Therefore, light which falls both through the first openings in the first shading plate and also through the second openings in the second shading plate is only incident at a small angle of incidence on the roof. This may be the case when the sun stands at an incline, for example, in particular in the early morning or late evening. The intensity of the incident radiation is therefore low and no noteworthy heating of the roof occurs. The solar radiation on the roof and heating of the roof accompanying it, in particular at noontime, is prevented as described.

If all of the solar radiation on the roof is to be avoided, the second shading plate is arranged between the first shading plate and the roof so that the second openings of the second shading plate are free of the passage of light which falls through the first openings of the first shading plate. Light which falls through the first openings in the first shading plate is therefore incident on the webs of the second shading plate and does not pass through the second openings in the second shading plate.

Alternatively to the second shading plate, but also in combination with the second shading plate, the first shading plate has sheet-metal tongues protruding, in particular diagonally, from the first shading plate, which at least partially cover the first openings in the first shading plate. The sheet-metal tongues reduce the clearance dimension of the first openings perpendicular to the roof. They therefore shade the first openings at least perpendicularly to the roof, and therefore in particular perpendicularly to the first shading plate.

The intended purpose of the sheet-metal tongues is that light is incident at a small angle of incidence on the roof through the first openings in the first shading plate, to keep the intensity of the incident radiation low. This is achieved, for example, in that the sheet-metal tongues have an angle in the interval of 10° to 80°, in particular 30° to 50°, to the first, in particular horizontal shading plate in a plane parallel to a longitudinal axis of the rail vehicle and perpendicular to the shading plate.

In a refinement, the sheet-metal tongues are connected without joints to the first shading plate, for example along sections which are parallel to one another and perpendicular to the longitudinal axis of the rail vehicle. The sheet-metal tongues are produced, for example, in that firstly U-shaped sheet-metal tongues are severed from the first shading plate, in particular cut into the first shading plate, and these tongues are subsequently bent away from the first shading plate. The shape and size of the sheet-metal tongues are then capable of completely closing the first openings in the first shading plate, except for manufacturing-related tolerances, if the sheet-metal tongues were bent into the plane of the first shading plate. In a refinement, the sheet-metal tongues are bent pointing away from the roof. In another variant, however, they can also be bent toward the roof.

If a second shading plate is arranged between the first shading plate having sheet-metal tongues and the roof, an offset arrangement of the shading plates to one another, so that the webs of the one shading plate overlap the openings of the other shading plate and they therefore mutually shade one another, is not necessary. Because the light falling through the first openings has an angle not equal to 90° to the second shading plate, the first and second openings of the first and second shading plates can be aligned concentrically, and the light nonetheless falls on a second web of the second shading plate.

The first shading plate has in particular a first surface facing away from the roof and a second surface facing toward the roof. Similarly, the second shading plate has a first surface facing away from the roof and a second surface facing toward the roof. If the two shading plates are arranged in parallel to one another and in parallel to the roof of the rail vehicle, in particular horizontally, the first surfaces of the shading plates point upward, away from the rail vehicle, in particular vertically, and the second surfaces correspondingly point toward the rail vehicle. If a sheet-metal tongue of the first shading plate were bent at an angle of 90° to the first shading plate, it would not contribute to the first surface or the second surface of the first shading plate. Sheet-metal tongues at an angle in the interval of 10° to 80° to the first shading plate, in contrast, have a first surface associated with the first surface of the first shading plate and a second surface associated with the second surface of the second shading plate.

According to a further refinement of the invention, the material of the first shading plate, in particular the material of the first surface of the first shading plate is selected and the first surface of the first shading plate is processed and/or coated so that it absorbs more visible light than it reflects. Electromagnetic radiation having wavelengths from 380 nm to 780 nm is referred to as visible light in the meaning of this invention. In this case, the absorbed and reflected powers of the incident radiation on the first surface of the first shading plate are compared. In particular more light power is absorbed, and therefore converted into heat, than is reflected by the first shading plate.

According to one embodiment, the material of the first shading plate, in particular the material of the first surface of the first shading plate, is selected and the first surface of the first shading plate is processed and/or coated so that an absorption of electromagnetic radiation in the wavelength range of 300 nm to 100 μm by the first surface of the first shading plate is greater than the sum of dissipation, transmission, and reflection of the mentioned electromagnetic radiation. In addition to the visible light, the infrared radiation is also absorbed better than it is reflected here. Dissipation and transmission of electromagnetic radiation in the mentioned wavelength range are approximately zero due to the selection of an intransparent material of the first shading plate and/or the surface of the first shading plate. One embodiment provides that the first surface of the first shading plate absorbs more than twice, in particular more than eight times the radiation power in comparison to the reflected radiation power. In particular, the first surface of the first shading plate has an oriented degree of spectral absorption in the direction of the surface normals for electromagnetic radiation having wavelengths of 300 nm to 100 μm, in particular for visible light, greater than 0.5, in particular greater than 0.7.

A further refinement provides that the material of the first shading plate, in particular of the first surface of the first shading plate is selected and the first surface of the first shading plate is processed and/or coated so that the first shading plate on the side of the first surface has a heat transfer coefficient to stationary air perpendicular to the shading plate of at least 5 W/(m²*K), in particular at least 7 W/(m²*K). A heat transfer requires a temperature difference of the two adjoining media, the first shading plate and the air surrounding the first shading plate here. The heat transfer coefficient is in turn dependent on the media, the surrounding air and the material of the first surface of the first shading plate and/or the material of the first shading plate here. The heat transfer primarily takes place due to a heat transfer by convection at the interface of first surface of the first shading plate and the surrounding air. The heat transfer coefficient is ascertained according to a standardized method. In addition to the material, it is also dependent on the surface composition of the first surface of the first shading plate and on the chemical composition of the surrounding air and on a flow speed of the surrounding air along the first shading plate.

The specified values relate to a heat transfer in the case of air which is stationary in relation to the first surface.

The first shading plate is heated by solar radiation due to a high degree of spectral absorption for electromagnetic radiation having wavelengths in the interval of 300 nm to 100 µm, but at least for visible light. The first shading plate, which is heated in relation to its surroundings, subsequently in turn heats the surrounding air due to good heat transfer, in particular the air layer of the surrounding air adjoining the first surface of the first shading plate.

A further refinement provides that the second surface of the first shading plate is processed and/or coated so that it has a total degree of emission $\epsilon_n$ in the direction of the surface normals of at most 0.7, in particular at most 0.5. The first surface can also be processed and/or coated so that it has a total degree of emission $\epsilon_n$ in the direction of the surface normals of at most 0.7, in particular at most 0.5.

The power of the emitted thermal radiation is independent in this case on the material of the radiator and is dependent on the surface of the radiator. The total degree of emission is dependent on, in addition to the angle of the emission, which is 90° to the corresponding surface here, the temperature of the radiator, in particular the temperature of its surface, and possibly only applies in a predefined wavelength range. The total degree of emission is typically ascertained in standard conditions and specified accordingly. This also applies here. For the function of the invention, above all a low emission of infrared radiation is advantageous. Therefore, an oriented degree of spectral emission in the direction of the surface normals for electromagnetic radiation having wavelengths in the interval 300 nm to 100 µm is in particular less than 0.7 or even less than 0.5. The last-mentioned oriented degree of spectral emission in the direction of the surface normals for electromagnetic radiation having wavelengths in the specified interval is referred to hereafter as the oriented degree of spectral emission.

With a relatively small degree of emission and simultaneously a relatively high degree of absorption for visible light and optionally infrared radiation of the first surface of the first shading plate, it is ensured that little of the solar radiation converted into heat is emitted again by thermal radiation. This is achieved, for example, in that a comparatively rough, matte black powder coating is applied to the first surface of the first shading plate. The largest possible fraction of reflected radiation is again itself absorbed by the microscopic small protrusions and depressions and the surface area thus reduced, which can emit the radiation perpendicularly from the surface.

If the second surface of the second shading plate is also processed and/or coated so that it has a total degree of emission $\epsilon_n$ in the direction of the surface normals and/or an oriented degree of spectral emission of less than 0.7, in particular less than 0.5, only little radiation is emitted by the second shading plate and therefore thermal radiation is only slightly emitted in the direction of the roof of the rail vehicle. The second surface of the second shading plate can have the same or a smaller value for the total degree of emission $\epsilon_n$ in the direction of the surface normals and/or for the oriented degree of spectral emission than the second surface of the first shading plate. Since the second shading plate has a significantly lower temperature in solar radiation than the first shading plate, a surface-normal heat flow to the roof of the rail vehicle by way of thermal radiation emitted from the second surface of the second shading plate is less than a heat flow by way of the thermal radiation emitted by the second surface of the first shading plate in the direction of the second shading plate.

In a simple embodiment, the second shading plate has two similarly processed surfaces, whereby the first surface also has the mentioned total degree of emission $\epsilon_n$ in the direction of the surface normals and/or the mentioned oriented degree of spectral emission. The first surface of the second shading plate can, however, also have a total degree of emission $\epsilon_n$ in the direction of the surface normals and/or an oriented degree of spectral emission of greater than 0.5, in particular greater than 0.7. By way of thermal radiation emission in the direction of the first shading plate, the second shading plate is cooled and the first shading plate is heated further. In contrast to the first shading plate, the second shading plate can have a heat transfer coefficient to stationary air perpendicular to the shading plate of less than 7 W/(m$^2$*K), in particular less than 5 W/(m$^2$*K), in particular on both surfaces.

The first surface of the second shading plate can furthermore be processed and/or coated so that it has an oriented degree of spectral absorption in the direction of the surface normals for electromagnetic radiation having wavelengths of 380 nm to 780 nm, in particular for electromagnetic radiation having wavelengths in the interval of 300 nm to 100 µm which is equal to or less than an oriented degree of spectral absorption in the direction of the surface normals for electromagnetic radiation having wavelengths of 380 nm to 780 nm, in particular for electromagnetic radiation having wavelengths in the interval of 300 nm to 100 µm of the first surface of the first shading plate. In particular, the ratio of the mentioned degree of absorption of the first surface of the first shading plate and the mentioned degree of absorption of the first surface of the second shading plate is greater than 1.5, in particular greater than 2.

In relation to surface normals, the first surface of the second shading plate absorbs an equal amount of or less visible light or electromagnetic radiation in the wavelength range of 300 nm to 100 µm than the first surface of the first shading plate.

Due to a lesser absorption of electromagnetic radiation, in particular of visible light and infrared light, the second shading plate does not heat up to a comparable extent as the first shading plate and remains significantly cooler in the event of strong solar radiation.

An intermediate space between the second shading plate and the roof of the rail vehicle is delimited in the vertical direction by the second shading plate and the roof of the rail vehicle. According to a further refinement of the invention, the second shading plate is arranged on the roof of the rail vehicle so that surrounding air can flow horizontally into the intermediate space. The intermediate space is therefore freely accessible horizontally at least for inflowing surrounding air. If the second shading plate is arranged in parallel to the roof and horizontally on the roof, the surrounding air can flow into the intermediate space at the sides of the rail vehicle and/or from the end sides of the rail vehicle. If the intermediate space is open on both sides or even on all sides of the rail vehicle, air can flow through it. This is achieved, for example, in that the second shading plate is supported on column-like spacers on the roof of the rail vehicle. The spacers can be arranged distributed over the area of the second shading plate. If the second shading plate and the roof are connected to one another by walls at the edge of the second shading plate and/or of the roof, openings are provided in these walls, through which surrounding air can flow.

Surrounding air flowing into the intermediate space between the second shading plate and the roof of the rail vehicle is used for cooling the roof of the rail vehicle.

In a refinement, an intermediate space between the first shading plate and the second shading plate is horizontally terminated, for example the first and the second shading plates are connected to one another by walls at the edge of the first and/or the second shading plate and/or between their edges while forming chambers, so that surrounding air cannot flow horizontally into the intermediate space. Surrounding air thus cannot flow horizontally freely into the intermediate space and/or air cannot flow freely between the chambers, but rather can flow exclusively, in particular upward, through the correspondingly designed openings of the shading plates.

If the roof structure is formed by a first shading plate and optionally by a second shading plate, which are arranged at a distance from one another and at a distance from the roof of the rail vehicle, wherein the first shading plate has a high degree of spectral absorption for visible light and optionally infrared radiation and a high heat conduction coefficient to air, the first shading plate is then heated by solar radiation. The surrounding air is thus heated over the first shading plate. The heated air disengages from the first shading plate and rises upward. Air is guided in through the openings of the first shading plate, and is then guided through the roof structure according to the invention from the surroundings of the rail vehicle for this purpose over the roof of the rail vehicle, and this roof is thus cooled. The embodiment and arrangement of the shading plates according to the invention results in the use of the invention in a forced air flow over the roof, between the first shading plate and the roof or preferably between the second shading plate and the roof.

Provided sheet-metal tongues in the first shading plate are therefore not only used for the purpose of reduced solar radiation on the roof and/or on the second shading plate. In addition, they can be used for guiding the mentioned air flows. Similar chimneys can also generate a chimney effect, in the event of appropriate shaping.

According to a further refinement of the rail vehicle, the roof has a surface of the roof pointing toward the first shading plate, which is processed and/or coated so that it has a total degree of emission $\epsilon_n$ in the direction of the surface normals and/or an oriented degree of spectral emission of at most 0.7, in particular at most 0.5. This prevents the roof to be cooled from emitting its heat via thermal radiation to the first or the second shading plate, and this plate heating up accordingly, but rather only emitting the heat to the air flowing over the roof. It therefore in particular also has a heat transfer coefficient to stationary air perpendicular to the roof of at least 4 $W/(m^2*K)$, in particular at least 7 $W/(m^2*K)$. A lower degree of spectral absorption for infrared radiation is also advantageous. Therefore, for example, a ratio of the oriented degree of spectral absorption in the direction of the surface normals for electromagnetic radiation having wavelengths of 380 nm to 780 nm, in particular for electromagnetic radiation having wavelengths in the interval of 300 nm to 100 μm of the surface of the roof facing toward the first shading plate and the oriented degree of spectral absorption in the direction of the surface normals for electromagnetic radiation having wavelengths of 380 nm to 780 nm, in particular for electromagnetic radiation having wavelengths in the interval of 300 nm to 100 μm of the first surface of the second shading plate assumes values in the interval of 0.7 to 1.3. In particular, the ratio is approximately 1. The surface of the roof pointing toward the first shading plate is again to be processed and/or coated accordingly.

Rail vehicles, in particular low-loader rail vehicles for public short-range passenger transport, often have device containers on their roof. The device containers enclose in this case, for example, power electronics and/or drive assemblies to be cooled. The device containers are typically terminated on top by a cover plate. The cover plate therefore forms the roof of the rail vehicle in the meaning of the invention.

A further embodiment of the invention provides that at least the first shading plate and/or the second shading plate protrudes over the roof of the rail vehicle. In this case, the first shading plate and/or the second shading plate do not have to protrude beyond the side walls and/or the end sides of the rail vehicle. It is sufficient to protrude beyond the device container to be cooled on the roof of the rail vehicle.

The first and/or the second shading plate is produced, for example, from a metal or a metal alloy, in particular from AlMg 4.5 or 1.4301. The second shading plate is correspondingly unpainted, in particular ground or polished so it is smooth and glossy.

The invention permits numerous embodiments. It will be explained in greater detail on the basis of the following figures, in each of which an exemplary embodiment is shown. Identical elements in the figures are provided with identical reference signs.

DESCRIPTION OF THE INVENTION

Figure 1:
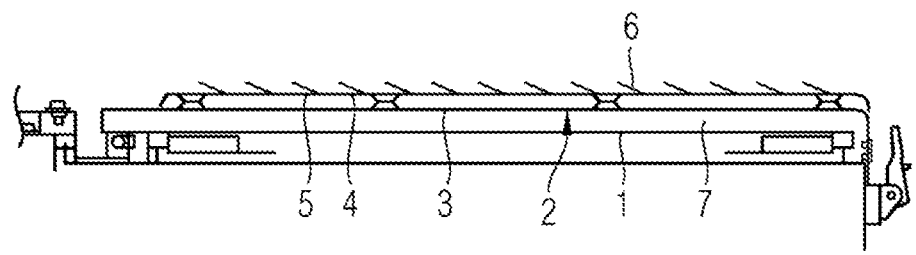
FIG. 1 shows a cross section through a roof structure of a rail vehicle according to the invention.

FIG. 1 shows a roof structure of a rail vehicle in cross section. A cover plate forms the air-tight and rain-tight cover of a container of the rail vehicle and therefore the roof 1 of the rail vehicle. A two-shell awning 2 is arranged at a distance above the roof 1, which has a first shading plate 4, which is arranged here horizontally and in parallel to the roof 1, having first openings 5 and at a distance thereto a second shading plate 3, which is arranged in parallel, having second openings. The second openings are not shown here for the sake of simplicity. The first shading plate 4 additionally has sheet-metal tongues 6, which at least partially cover the first openings 5, since the sheet-metal tongues 6 are connected at edges 9, which are parallel to one another and perpendicular to a longitudinal axis of the rail vehicle, of the first openings 5 to the first shading plate 4, in particular without a joint, and have an angle to the first shading plate 4 of approximately 20° here. The edges 9 are the edges having the mentioned secondary conditions of the first openings 5 here, which are closer to a bow of the rail vehicle.

An intermediate space 7 is provided for cooling between the first and the second shading plates 4 and 3.

Figure 2:
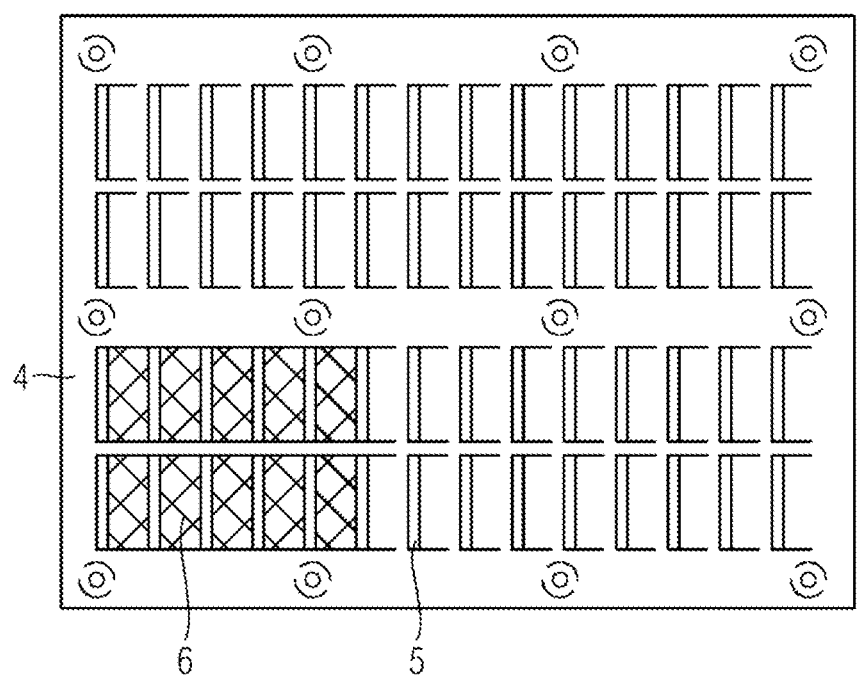
FIG. 2 shows a top view of the roof structure from FIG. 1.

FIG. 2 illustrates the roof structure from FIG. 1 in a top view. The first shading plate 4 has a pattern having multiple double rows of openings 5, which are manufactured by stamping and bending up the sheet-metal tongues 6 out of the first shading plate 4. The material is accordingly bent upward at opening edges and forms the sheet-metal tongues 6, which are oriented diagonally upward.

Figure 3:
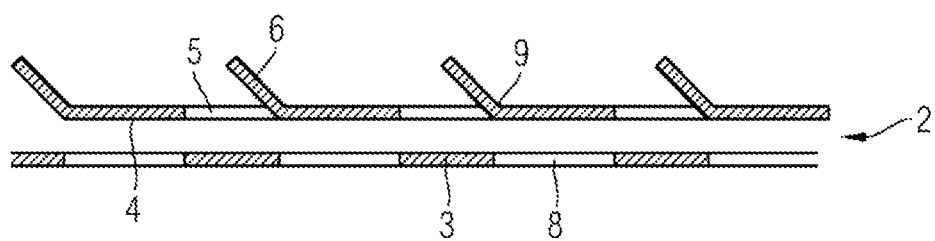
FIG. 3 shows a cross section through two shading plates according to the invention.

The two-shell awning 2 in FIG. 3 has a first and a second shading plate 4 and 3, which are formed in relation to one another and arranged offset in relation to one another so that they mutually shade one another. The second openings 8 completely cover the first openings perpendicular to a shared normal on the shading plates 4 and 3 here. The shading plates 4 and 3 have equal lattice widths here and are arranged offset to one another so that one opening 5 of the first shading plate 4 comes to rest over a web of the second shading plate 3. If light is incident at an arbitrary point through both openings on the roof, the angle of incidence of the light to the roof is thus less than 90° here.

In the exemplary embodiment shown, the sheet-metal tongues 6 are aligned transversely to the travel direction, so that the ventilation of the air space located between the shading plates 4 and 3 is equal in both travel directions of the rail vehicle. The sheet-metal tongues 6 capture the travel wind and conduct it into the intermediate space 7. They also promote the ventilation of the rail vehicle when it is stationary. In relation to a first opening free of sheet-metal tongues, the sheet-metal tongues 6 conduct rising warm air in a predefined direction, so that it can exit with less turbulence from the two-shell awning 2.

Figure 4:
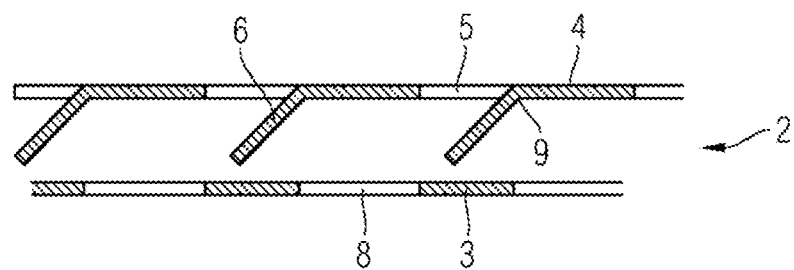
FIG. 4 shows a further cross section through two shading plates according to the invention, FIG. 5 schematically shows air flows on a roof structure according to the invention.

In contrast to FIG. 3, the sheet-metal tongues 6 in FIG. 4 are inclined toward the roof. Therefore, they protrude into the air space between the first and the second shading plates 4 and 3. Warm air is also discharged from below, upward out of the roof region, in this way. The second openings 8 are also offset diagonally to the first openings 5 for shading here. The first shading plate 4 is enameled matte on its upper side facing away from the second shading plate 3, to emit heat. The second shading plate 3, in contrast, is bare polished here.

FIG. 5 illustrates the mode of action of a roof structure according to the invention. A device container 14, which is terminated on top by the cover plate 15, and a first shading plate 4 arranged at a distance therefrom and a second shading plate 3, which is arranged between cover plate 15 and first shading plate 4, and which in turn has a distance greater than zero to the cover plate 15 and to the first shading plate 4, are shown in cross section. The cover plate 15 forms the roof 1 of the rail vehicle here. Both the first shading plate 4 and also the second shading plate 3 each have multiple openings 5, 8 for the passage of air. They extend horizontally.

The first surface 10 of the first shading plate 4 is capable of absorbing a greater power of incident light and it is capable of heat transfer to the surrounding air directly adjoining the first shading plate, so that the surrounding air is strongly heated by solar radiation on the first surface of the first shading plate, to subsequently detach as a thermal bubble and draw fresh air through the openings 5 in the first shading plate 4. Since air between the first shading plate 4 and the second shading plate 3 can exclusively flow in through the openings 8 of the second shading plate 3, further, cool surrounding air, at the temperature T1 here, is horizontally guided in between the second shading plate 3 and the roof 1. The air flows are guided by the design of the sheet-metal tongues 6. The air flows are illustrated using arrows.

If the first surface 10 of the first shading plate 4 has a greater degree of absorption for at least visible light, the first shading plate is thus more strongly heated by incident light, to a temperature T2>T1 here, and the temperature difference between the first shading plate 4 and the air located above it is increased. The heat flow from the first shading plate 4 to the air is thus greater and the air is heated more strongly. The first surface 10 of the first shading plate 4 has a high degree of absorption for light incident on the first shading plate 4, for example, because it is painted dark, in particular black. A lower degree of absorption for incident light is achieved, for example, by a white paint or a reflective surface.

It is of secondary importance that little thermal radiation is emitted by the two shading plates 3 and 4 in the direction of the roof 1 of the rail vehicle and little light energy is converted into heat energy by the second shading plate 3. This is achieved in particular in that the first surface 12, the upper side of the first shading plate here, is painted black, and the first surface 12, the upper side of the second shading plate 3 here, and also the second surfaces 11 and 13, the lower sides of the first and the second shading plates 4 and 3 here, are correspondingly painted a different color or are not painted. For example, the second surface 11 of the first shading plate 4 and/or the first and/or the second surfaces 12, 13 of the second shading plate 3 comprise bare polished metal.

The invention claimed is:

1. A rail vehicle, comprising:
a roof;
a first shading plate disposed at a distance from said roof, said first shading plate having first openings formed therein for a passage of air;
a second shading plate disposed between said first shading plate and said roof, said second shading plate having second openings formed therein for a passage of air;
said second shading plate being disposed at a location between said first shading plate and said roof causing a projection of said first and second shading plates on said roof at least perpendicular to said roof to be free of openings; and
said second shading plate being disposed at a location between said first shading plate and said roof causing each straight line, extending through said first and second openings and intersecting said roof, to intersect said roof at an angle less than 30°.

2. The rail vehicle according to claim 1, wherein said first shading plate has a first surface facing away from said roof, and said first surface is at least one of processed or coated to absorb more visible light than it reflects.

3. The rail vehicle according to claim 2, wherein a ratio of a first distance between said first shading plate and said roof to a second distance between said second shading plate and said roof is between 1 and 1.5.

4. The rail vehicle according to claim 1, wherein said first shading plate has a first surface facing away from said roof, and said first surface is formed of a material and is at least one of processed or coated to have a heat transfer coefficient to stationary air perpendicular to said first shading plate of at least $7W/(m^2 *K)$.

5. The rail vehicle according to claim 1, wherein said second shading plate is disposed parallel to said first shading plate.

6. The rail vehicle according to claim 1, wherein said second shading plate and said roof define an intermediate space therebetween being delimited in a vertical direction by said second shading plate and said roof, and said second shading plate is positioned relative to said roof to permit surrounding air to flow horizontally into said intermediate space.

7. The rail vehicle according to claim 1, wherein said first shading plate has sheet-metal tongues at least partially covering said first openings in said first shading plate.

8. The rail vehicle according to claim 7, wherein said sheet-metal tongues form an angle of between 30° and 50° with said first shading plate in a plane parallel to a longitudinal axis of the rail vehicle and perpendicular to said first shading plate.

9. A rail vehicle, comprising:
a roof;
a first shading plate disposed at a distance from said roof;
said first shading plate having first openings formed therein for a passage of air; and
said first shading plate having a second surface facing toward said roof, said second surface being at least one of processed or coated to have an oriented degree of spectral emission in a direction of surface normals for electromagnetic radiation having wavelengths in an interval of 300 nm to 100 µm of at most 0.5.

10. A rail vehicle, comprising:

a roof;

a first shading plate disposed at a distance from said roof, said first shading plate having first openings formed therein for a passage of air;

a second shading plate disposed between said first shading plate and said roof, said second shading plate having second openings formed therein for a passage of air; and said second shading plate having a first surface facing away from said roof and a second surface facing toward said roof, said second surface of said second shading plate being at least one of processed or coated to have an oriented degree of spectral emission in a direction of surface normals for electromagnetic radiation having wavelengths in an interval of 300 nm to 100 µm of less than 0.5.

11. A rail vehicle, comprising:

a roof:

a first shading plate disposed at a distance from said roof, said first shading plate having first openings formed therein for a passage of air;

said first shading plate having a first surface facing away from said roof;

said first surface of said first shading plate being at least one of processed or coated to absorb more visible light than it reflects;

a second shading plate disposed between said first shading plate and said roof, said second shading plate having second openings formed therein for a passage of air;

said second shading plate having a first surface facing away from said roof and a second surface facing toward said roof; and said first surface of said second shading plate being at least one of processed or coated to have an oriented degree of spectral absorption in a direction of surface normals for electromagnetic radiation having wavelengths in an interval of 300 nm to 100 µm being equal to or less than an oriented degree of spectral absorption in a direction of surface normals for electromagnetic radiation having wavelengths of 300 nm to 100 µm of said first surface of said first shading plate.

12. A rail vehicle, comprising:

a roof;

a first shading plate disposed at a distance from said roof;

said first shading plate having first openings formed therein for a passage of air;

said first shading plate having sheet-metal tongues at least partially covering said first openings in said first shading plate; and said sheet-metal tongues being reshaped from said first shading plate and connected to said first shading plate without joints.

* * * * *